United States Patent
Kähler et al.

(10) Patent No.: US 8,010,096 B2
(45) Date of Patent: Aug. 30, 2011

(54) CONTROLLING MOBILE TERMINALS

(75) Inventors: Thomas Kähler, Aachen (DE); Frank Bell, Köln (DE)

(73) Assignee: Communology GmbH, Köln (DE)

( * ) Notice: Subject to any disclaimer, the term of this patent is extended or adjusted under 35 U.S.C. 154(b) by 47 days.

(21) Appl. No.: 12/594,107

(22) PCT Filed: Mar. 12, 2008

(86) PCT No.: PCT/EP2008/052898
§ 371 (c)(1),
(2), (4) Date: Sep. 30, 2009

(87) PCT Pub. No.: WO2008/119627
PCT Pub. Date: Oct. 9, 2008

(65) Prior Publication Data
US 2010/0136961 A1    Jun. 3, 2010

(30) Foreign Application Priority Data
Mar. 30, 2007  (EP) .................................... 07006675

(51) Int. Cl.
*H04M 3/00*      (2006.01)
*H04M 1/00*      (2006.01)

(52) U.S. Cl. ...................................... 455/418; 455/558
(58) Field of Classification Search .......... 455/418–420, 455/423–425, 67.11, 558, 414.1
See application file for complete search history.

(56) References Cited

U.S. PATENT DOCUMENTS

| | | | |
|---|---|---|---|
| 6,690,930 B1 * | 2/2004 | Dupre | 455/411 |
| 6,856,802 B1 * | 2/2005 | Kinnunen et al. | 455/425 |
| 7,596,373 B2 * | 9/2009 | McGregor et al. | 455/425 |
| 7,623,856 B2 * | 11/2009 | Azuma | 455/425 |
| 2003/0032408 A1 | 2/2003 | Jennings | |
| 2004/0157584 A1 * | 8/2004 | Bensimon et al. | 455/411 |
| 2005/0176464 A1 * | 8/2005 | Portasany Sanchez | 455/558 |
| 2005/0239504 A1 * | 10/2005 | Ishii et al. | 455/558 |
| 2006/0205398 A1 * | 9/2006 | Seckendorf et al. | 455/423 |
| 2007/0117560 A1 * | 5/2007 | Pora et al. | 455/423 |
| 2007/0207798 A1 * | 9/2007 | Talozi et al. | 455/423 |

FOREIGN PATENT DOCUMENTS

| | | |
|---|---|---|
| DE | 102004049611 A1 | 4/2006 |
| EP | 1619911 A1 | 1/2006 |
| WO | WO 00/40049 | 7/2000 |

OTHER PUBLICATIONS

European Patent Office, International Search Report, PCT/EP2008/052898, May 30, 2008.

* cited by examiner

*Primary Examiner* — Brandon Miller
(74) *Attorney, Agent, or Firm* — Sunstein Kann Murphy & Timbers LLP

(57) ABSTRACT

For an automatic control of a mobile terminal, a method is proposed for the control of a mobile terminal by receiving a set of control commands in a mobile terminal comprising a processor, a subscriber module and a communications unit, storing a set of control commands in a memory of a subscriber module of a mobile terminal, and activating of functions of the mobile terminal by the subscriber module as a function of commands of the set of control commands via an interface between the subscriber module and the mobile terminal.

29 Claims, 2 Drawing Sheets

CONTROLLING MOBILE TERMINALS

The application relates to a method for the controlling mobile terminals. The application further relates to a mobile terminal, to a system having a mobile terminal and a background system and to a computer program for controlling a mobile terminal.

Nowadays, mobile terminals for wireless communication, for example mobile telephones, smartphones, PDAs (Personal Digital Assistants), mobile games consoles, mobile multimedia apparatuses, mobile cameras having communication functions or else other mobile communications devices have a large number of functions. In recent years, as a result of constant and rapid technical and economic ongoing development, the functions and thus the complexity within mobile terminals have constantly increased. This relates not only to the basic technology, for example the various transmission methods, such as for example GSM, CDMA, WCDMA, UMTS and the like, but also to programs. Programs may be, for example, basic software applications, such as for example the Short Message Service (SMS), Multimedia Message Service (MMS), Wireless Application Protocol (WAP) and the like, or else execution platforms for executing supplementary programs. Execution platforms may, for example, be Java, J2ME, Symbian C++, Windows Mobile, Brew, Flash Lite, Linux or the like. Other operating systems are also the subject-matter of the application. In addition to the execution platforms, programs may also be software applications or value-added services. Software applications or value-added services may, for example, be Push-to-Talk over Cellular (POC), Instant Messaging (IM), Instant Messaging Presence Services (IMPS), Digital Rights Management (DRM), Streaming, Mobile Television, Mobile Music, Web Browsing or the like.

The provision of the various software applications and value-added services leads to increased complexity in the apparatuses. Network operators attach increased importance to the software applications and value-added services provided functioning in flawless manner. In order to keep up customer satisfaction, it is necessary that the mobile communications customers be equipped at all times with functioning programs, services and value-added services. For network operators, it is not acceptable for software errors to give rise to problems in the use of the value-added services. Nor is it desirable, for economic reasons, for customers to engage, each time a problem occurs with the software, a member of staff in a customer centre to solve the problem.

It is therefore economically necessary to automate, as far as possible, testing both of new and of old technologies and programs or value-added services in order to be able in any way to carry out the necessary tests in reasonable time and with the necessary quality. This criterion is, in particular, necessary in order to keep up the time to market and the service quality.

However, in practice, an increasingly large number of terminals may be seen to reach the market in ever shorter time. The programs or value-added services offered by the network operators have to function on these various terminals which provide a broad range of operating systems. It also occurs that, as a result of the increasingly short product cycles, the new devices are delivered with software bugs. These software bugs cause problems with the value-added services and irritate customers.

A further drawback is the fact that new services must function straight away in order to be accepted by the customer. Services which have to be laboriously configured by customers and in many cases do not work are soon rejected by customers and market penetration becomes almost impossible. The entire value creation chain therefore requires operative, well-tested value-added services to be brought to the market.

Untested value-added services can lead to crashes of the execution platforms of mobile terminals. That can lead to the mobile terminals no longer functioning and no longer being able to be used by the users. This leads, on the one hand, to the mobile communications operators and terminal manufacturers having to repair the apparatuses, usually within the guarantee period; this leads to considerable costs. On the other hand, the customers cannot use the apparatuses during the repair time and the mobile communications operators lose earnings as a result.

For the aforementioned reasons, both mobile communications operators and terminal manufacturers carry out a broad range of tests with the apparatuses. These tests involve testing the execution platforms and the basic software applications. The software applications, programs and value-added services are also extensively tested.

Manual tests are, for example, used for this purpose. In manual tests, a human tester personally performs actions. These actions may be, for example, the pressing of keys in a predetermined sequence in accordance with a predefined test. The reactions caused by the keystrokes on the terminals are logged and registered manually. By carrying out the predefined test scenarios and test sequences, it is possible to rule out a large number of errors. However, the manual inputting of the key inputs in accordance with the test sequence is time-consuming and leads to high costs. Owing to the manufacturers', suppliers' and also mobile communications operators' limited test resources, it is therefore not possible to test out all the terminals completely.

It is also possible for a sequence of keystrokes to be programmed with the aid of a robot. The mobile terminal is operated by the robot in that the robot presses the keys as it is programmed to do. The actions and functional states of the mobile telephones that are triggered by the keys are monitored and logged either manually or automatically. Any errors may be avoided based on the test results.

It is also known to test software applications and value-added services with the aid of software agents. For this purpose, it is proposed to load the software agents onto the mobile terminals. The software agents loaded onto the mobile terminals are stored in the memory of the mobile terminal and executed by the processor of the mobile terminal. A test sequence is stored in the mobile agent. When the agents are executed by the processor present in the mobile terminal, the predefined procedure is carried out. All the agents' actions generate a result which can be registered by the agent and can, for example, automatically be compared with a desired value. It is also possible for the agent to store the results and transmit them to the mobile communications network.

As a result of the fact that the agents are executed on the processors of the mobile telephone themselves, it can occur that the agents influence the software applications and value-added services to be tested. For example, it is possible, in the event of a program error within the agent itself, for the test sequence to lead to an error. However, this error resides not in the program or value-added service itself to be tested, but in the software agent. However, the software agent cannot tell that it itself caused the error. In this case, finding out the cause of the detected error is complex and laborious.

In addition, it is possible to automatically configure the value-added services and software applications for various network operators. A method for the configuration of a mobile terminal is, for example, known from DE 10 2004 049

611 A1. In this case, a subscriber module transmits a request of configuration data to a background system, for example a mobile communications network, for example a cellular communications network. As a function of the request of the configuration data, configuration data are transmitted from the background system to the terminal and the terminal is automatically configured in accordance with the configuration data. With the aid of this configuration, it is possible to configure the parameters and/or the user interface of the mobile terminals. However, the transmission of configuration data is not suitable for testing the functionality of software applications or value-added services. In addition, according to the teaching of this prior art, it is proposed that the configuration data be activated by the mobile telephone itself. However, in the case of defective configuration data, this can lead to the execution platform of the mobile terminal being disturbed and a manual configuration thus becoming necessary.

Starting from the indicated drawbacks, the application was based on the object of providing a method, a mobile terminal, a system and also a computer program allowing in a simple and flexible manner a transmission and carrying-out of control commands within the mobile terminal.

According to one subject-matter of the application, the object deduced hereinbefore and indicated from the prior art is achieved by a method for controlling a mobile terminal. Thereby a set of control commands is received in a mobile terminal comprising a processor, a subscriber module and a communications unit. The received set of control commands is stored in a memory of the subscriber module. After storage, functions of the mobile terminal are activated by the subscriber module as a function of commands of the set of control commands via an interface between the subscriber module and the mobile terminal.

It has been found that the subscriber module itself, which may be for example a Subscriber Identity Module (SIM) card, can activate and carry out the control commands. It is thus possible to carry out a set of control commands without using the processor of the mobile terminal itself. The control commands may, for example, be AT commands. AT commands may be standard control commands for a telephone. With the aid of these control commands, it is possible to activate a broad range of functions, for example keystrokes, within the mobile terminal. Thus, according to the application, the subscriber module carries out a function on the mobile terminal via an interface. The subscriber module thus controls a broad range of functions without using the processor of the mobile terminal itself for controlling the functions.

According to an embodiment, it is proposed that the set of control commands comprises at least commands for activating keystroke commands of the mobile terminal. Thus, it is for example possible to instruct, with the aid of the control commands, the mobile terminal to activate various keystrokes. For example, various sequences of keystrokes can be activated with the aid of the control commands. The set of control commands may be a batch of various commands. This batch can be processed in accordance with the application, allowing a sequence of various keystroke commands and also other commands to be carried out on the mobile terminal.

It is also possible for the set of control commands to comprise a test routine for testing a program which can be executed on the mobile terminal. The program which can be executed on the mobile terminal may, for example, be a value-added service. A value-added service of this type may, for example, be a Multimedia Messaging Service (MMS), a Push-to-Talk service, a Wireless Access Protocol (WAP) service, a Streaming service, an Instant Messaging (IM) service, a Web Browsing service or another service. The test routine stored in the control commands allows the various programs to be checked. In this case, the test routine allows, for example, various program sequences and menu structures of the programs to be run through and their functionality to be checked. The test routine allows, for example, a program, with all its broad range of functions and possibilities, to be checked. It is thus possible to test whether the program functions on the mobile terminal.

According to the application, it is proposed that the activating of functions of the mobile terminal by the subscriber module emulate actions of an actual user. As opposed to the possibility of carrying out a test manually, it is proposed that, by way of the transmission of the control commands to the mobile terminal, the manual key inputs be replaced by key inputs controlled by the subscriber module. The test sequence may be identical to a manual test. The difference consists in the fact that the subscriber module activates the mobile terminal via the interface in order to carry out the various functions.

According to one exemplary embodiment, it is proposed that the set of control commands be transmitted by a background system. A background system may, for example, be a GSM network, a CDMA network, a GPRS network, a UMTS network, another cellular network or a wireless or wired network. The set of control commands can be stored in the background system and be transmitted, at the request of the mobile terminal, to the mobile terminal via the background system.

In order to be able to check test results, it is proposed that functional states of the mobile terminal be stored, after activation of the functions, at least in the memory of the subscriber module and/or a memory of the mobile terminal. The functional states after the activating of individual control commands can be queried and stored. As a result, it is possible, after the processing of a plurality of sets of control commands, to check and to evaluate retrospectively the change of the functional states.

In order to be able to make a precise statement concerning the functionality of software applications, it is possible for states of a display of the mobile terminal or states of the processor of the mobile terminal or items within a menu structure of the mobile terminal to be queried and stored as functional states. As a result, it is possible to check whether the control commands have generated the desired reactions within the mobile terminal.

For example, it is possible for various desired states of the functional states of the mobile terminal to be defined along with the set of control commands. Based on the desired states, it is possible to check whether the actually attained functional states of the mobile terminals are correct. A desired/actual comparison allows it to be checked whether the sequence of the sets of control commands has led to the desired result.

In order to be able to carry out centrally a check of the tests carried out, it is proposed that the functional states be transmitted to the background system with the aid of the communications unit of the mobile terminal. In this case, it is, for example, possible for the functional states to be transmitted to the background system by means of short messages (SMS). It is also possible, for transmission of the functional states, for a data connection to be established between the mobile terminal and the background system and for the functional states to be transmitted via this data connection. It is, for example, possible for all the functional states attained during a sequence of a set of control commands to be stored in a file and for this file to be transmitted from the mobile terminal to the background system after processing of the control commands. This transmission can, for example, also be activated by the control commands. Good quality control is possible as a result of the fact that the background system stores the transmitted functional states. This allows the test results determined to be checked retrospectively.

For this purpose, it is, for example, possible for the functional states determined to be stored in a results database. The results database thus provides information about a large number of different tests and can be used retrospectively to verify the tests which have been carried out.

In order to check whether the value-added services and programs tested are functioning as desired on the various terminals, it is proposed that the transmitted functional states be evaluated by the background system. In this case, the background system can, for example, carry out a comparison of the desired states with the transmitted functional states and, in the event of a discrepancy, a warning signal can be issued.

It is, for example, possible to test a large number of different value-added services and programs, one after another, on one and the same mobile terminal. For this purpose, it is, for example, possible, once a first set of control commands has been processed, for said first set of control commands to transmit the stored functional states to the background system. Afterwards, a new set of control commands can be requested from the background system by the subscriber module. It is also possible, after processing of the control commands by the subscriber module, for a new program for transmission to the mobile terminal to be requested from the background system.

It is possible first to transmit a set of control commands that is appropriate for a program to a mobile terminal, then to transmit the corresponding program to the mobile terminal, in order subsequently to carry out the test, which is stored in the set of control commands, on the program on the mobile terminal in question. The requesting both of the new sets of control commands and of the new programs may also be dependent on the evaluation of the functional states. Thus, it may be possible to request new sets of control commands or new programs, for example, only when the evaluation of the functional states has yielded a positive evaluation result. It is also possible for the evaluation of the functional states to reveal that the actual state differs from the desired state. In this case, it may, for example, be helpful to request from the background system altered parameters for the control commands in order to bring the functional state of the mobile terminal into the desired state.

A request for new sets of control commands may, for example, be possible in that the subscriber module requests a set of control commands from the background system by means of the communications unit of the mobile terminal. In order to be able to test a broad range of programs or value-added services on various mobile terminals, it is necessary to design the sets of control commands in such a way that said sets of control commands are compatible with the mobile terminals on which the programs can be tested. Naturally, various mobile terminals have various menu structures and thus require a different type of sequence of keystrokes in order to attain the desired states. Therefore, it may be necessary to file for each type of a mobile terminal its own set of control commands in order to be able to test a program. For this reason, it is proposed that, together with the request of the set of control commands, at least one identification characterising the mobile terminal and/or the subscriber module be transmitted to the background system. With the aid of the identification of the mobile terminal, the background system can recognise what kind and/or what type of a mobile terminal is being tested. As a function of this identification, the background system can select the appropriate set of control commands and transmit it to the mobile terminal. With the aid of the appropriate set of control commands, the subscriber module can then test the mobile terminal.

It is also possible for a program to be tested already to be stored on the mobile terminal. If this is the case, it is necessary to know, for testing the program in the background system, which program is to be tested. In this case, it is possible, together with the request of the set of control commands, for at least one identification characterising the program which can be executed on the mobile terminal to be transmitted to the background system. With the aid of the identification of the program, the background system can select the set of control commands that is necessary for the control of the program to be tested.

According to one exemplary embodiment, it is proposed that the background system receives the request of the set of control commands and transmits the set of control commands to the mobile terminal as a response to the request. For this purpose, the background system can select various transmission methods.

For example, it is possible to transmit the set of control commands to the mobile terminal as SMS, MMS or via a data connection.

As described hereinbefore, it may be necessary, for testing various programs on various mobile terminals, for the type of the mobile terminal and the program to be tested to be known in order to select the corresponding set of control commands. It is therefore proposed that the background system evaluate the identification characterising the mobile terminal and/or the subscriber module and select, as a function of the result of the evaluation, a set of control commands from a selection of sets of control commands for transmission to the mobile terminal.

In order to allow a new program to be able to be requested independently of the processor of the mobile terminal, it is proposed that the program which can be executed on the mobile terminal be requested by the subscriber module from the background system by means of the communications unit of the mobile terminal.

In order to select a control command which is appropriate for the program to be tested, the background system can evaluate the identification characterising the program to be executed on the mobile terminal and select, as a function of the result of the evaluation, a set of control commands from a selection of sets of control commands for transmission to the mobile terminal.

The communication between the mobile terminal and the background system can take place, for example, via an air interface or a cable interface. The air interface can be formed, for example, by a cellular network.

The communication between the mobile terminal and the background system may, for example, be packet-switched or circuit-switched.

In order to automate starting of the test, the requesting of the set of control commands and/or of the program can be started by a trigger signal triggered by the mobile terminal. A trigger signal of this type may, for example, be the switching-on of the mobile terminal. A trigger signal may also be the plugging of the subscriber module into the mobile terminal. In this case, the set of control commands can be started in the subscriber module by a trigger signal triggered in the mobile terminal.

It is preferred for the subscriber module to be a Subscriber Identity Module (SIM). The subscriber module may also be a Universal SIM (USIM). The subscriber module may be suitable for carrying out sets of control commands. For this purpose, it is, for example, possible for the subscriber module to be able to execute a scripting language. It is also possible for the subscriber module to be Java-enabled and thus for it to be able to execute Java applications and/or applets.

It is preferred for the interface between the subscriber module and the mobile terminal to be a standardised interface. This standardised interface may, for example, be the Subscriber Identity Module Application Toolkit (SIM Toolkit) or the Universal Subscriber Identity Module Application Toolkit (USIM Toolkit). Via these interfaces, it is possible, for example, for AT commands or other control commands to be transmitted from the subscriber module to the mobile terminal and for the mobile terminal to carry out these actions.

A further aspect is a method for the control of a mobile terminal by receiving a request signal for a set of control commands which can be carried out in a subscriber module of a mobile terminal, selecting a stored set of control commands for transmission to a mobile terminal, and transmitting the selected set of control commands to the mobile terminal.

In order to select a suitable set of control commands, it is proposed that, together with the request signal, an identification characterising the mobile terminal and/or the subscriber module be received and that a set of control commands be selected from a selection of sets of control commands as a function of the identification.

A further aspect matter is a mobile terminal having a subscriber module, a processor, a communications unit configured for receiving a set of control commands, wherein the subscriber module is configured for storing the set of control commands, and wherein the subscriber module is configured for activating functions of the mobile terminal as a function of commands of the set of control commands via an interface between the subscriber module and the mobile terminal.

A further aspect is a system having an above-described mobile terminal and a background system having a memory for storing at least sets of control commands and a memory for storing at least functional states of the mobile terminal.

A further aspect is a computer program for the control of a mobile terminal with instructions for receiving a set of control commands in a mobile terminal comprising a processor, a subscriber module and a communications unit, storing the set of control commands in a memory of the subscriber module, and activating of functions of the mobile terminal by the subscriber module as a function of commands of the set of control commands via an interface between the subscriber module and the mobile terminal.

The application will be described hereinafter in greater detail with reference to drawings which show exemplary embodiments and in which.

Figure 1:
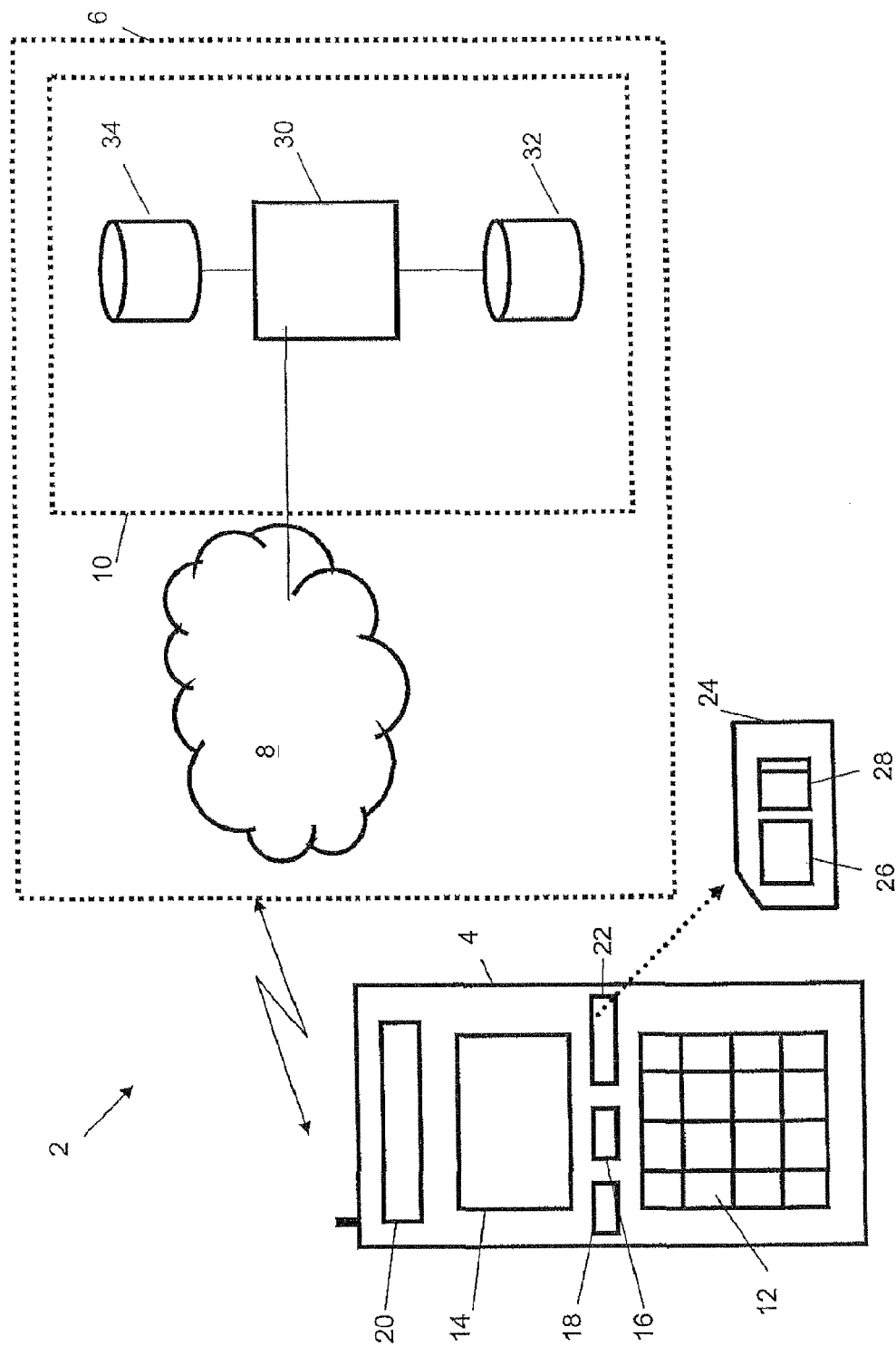
FIG. 1 shows a system having a mobile terminal and a background system.

FIG. 1 shows a system 2 having a mobile terminal 4, a background system 6 which is formed from a cellular network 8 and an Over-the-Air (OTA) server 10.

The mobile terminal 4 may, for example, be a mobile telephone, a smartphone, a PDA or another terminal for communication with the background system 6. The mobile terminal 4 comprises a keypad 12, a display 14 and a processor 16.

In addition, the mobile terminal 4 comprises a memory 18 and also a communications unit 20. Finally, the mobile terminal 4 comprises an interface 22 for communication with a subscriber module 24.

The subscriber module 24 comprises a processor 26 and a memory 28. The memory 28 is configured in such a way that it can store a set of control commands.

The background system 6 comprises the cellular network 8 and the OTA server 10. The OTA server is connected to a first database 32 and a results database 34 via a computer 30. Various sets of control commands are stored in the first database 32. Various types of mobile terminals can be associated with the sets of control commands. Various types of programs to be tested can also be associated with the sets of control commands. Thus, the first database 32 contains a library of sets of control commands which can be qualified by the type of a program and the type of a mobile terminal.

Functional states or sets of functional states received by the computer 30 via the cellular network 8 can be stored in the results database 34. In this case, it is possible to store the functional states or sets of functional states in association with specific types of mobile terminals 4 or specific programs.

The mobile terminal 4 is controlled via the keypad 12. An operating system, for example J2 MB, Symbian C++, Windows Mobile, Brew, Flash Lite, Linux or a different operating system, is stored in the memory 18. The operating system can be executed by the processor 16 and the mobile terminal 4 can communicate with the cellular network 8 via the communications unit 20. The functions of the operating system are invoked via the processor 16. Various menu structures can be displayed via the display 14. With the aid of the keypad 12, a user can navigate within the menu structure displayed on the display 14 and trigger various functions and functionalities.

In order to provide the user, in addition to pure telephony, with an added value through the mobile terminal, in addition to the operating system, a number of different programs, such as for example value-added services, can be stored in the memory 18. These programs can also be invoked by the processor 18. In order to use the value-added services, the user can use the keypad 12 and navigate accordingly through the menu structure, which is displayed via the display 14, and use the functions.

The subscriber module 24 may, for example, be a Subscriber Identity Module (SIM) card or a Universal Subscriber Identity Module (USIM) card. The subscriber module 24 can comprise a processor 26. Furthermore, the subscriber module 24 can compromise a computer usable medium such as a memory 28 which is divided into various memory regions. In the memory 28, a set of control commands can, for example, be stored in a specific memory region and be invoked via the processor 26. The processor 26 can, for example, be configured to execute Java programs or applications. For example, the subscriber module is a Java-enabled card.

The communication between the subscriber module 24 and the mobile terminal 4 takes place via the interface 22. The interface 22 may, for example, be a SIM Application Toolkit interface. It is also possible for the interface 22 to be a Universal SIM Application Toolkit interface. Other interfaces are also possible. Via the interface 22, the control commands stored in the memory 28, for example AT commands, can be transmitted to the mobile terminal 4 and thus, for example, keystrokes on the keypad 12 can be emulated. The processor 16 receives the control commands via the interface 22 and carries them out. For the processor 16, the carrying-out of these commands is independent of whether said carrying-out was initiated via an actual keystroke on the keypad 12 or via a control command via the interface 22.

Figure 2:
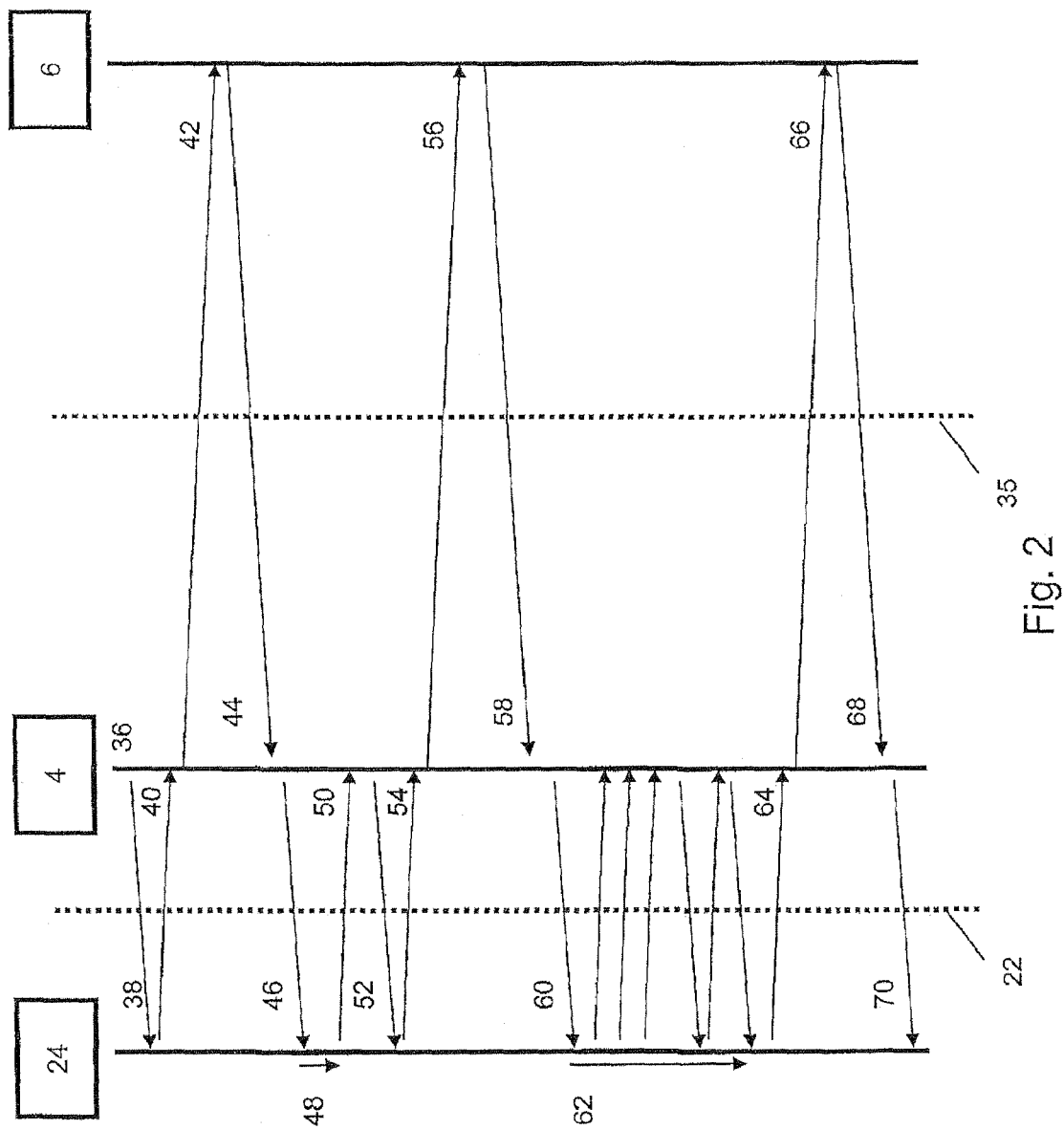
FIG. 2 is a flow chart of a method according to the application.

The method according to the application as shown in FIG. 2 will be described hereinafter in greater detail. FIG. 2 shows a sequence of communication between a mobile terminal 4, a subscriber module 24 and a background system 6. The mobile terminal 4 communicates with the subscriber module 24 via the interface 22. The mobile terminal 4 communicates with the background system 6 via an interface 36 which is supported by the communications unit 20 and the background system 8.

On switching-on 36 of the mobile terminal 4, a trigger signal 38 is transmitted to the subscriber module 24 via the interface 22. When the trigger signal 38 is received, the subscriber module 24 checks, with its processor 26 in its memory 28, the presence of a test routine, for example in the form of control commands.

If the memory 28 contains no such test routine, the subscriber module 24 transmits to the mobile terminal 4 via the interface 22 a request signal requesting a test routine. After receiving the request signal 40, the subscriber module 4 transmits a request signal 42 to the background system 6 via the interface 36. The request signal 42 contains, in addition to the designation of the requested test routine, also an identification characterising the mobile terminal and can additionally contain an identification characterising the subscriber module 24. The type of the mobile terminal can, for example, be contained in the identification characterising the mobile terminal 4.

After receiving the request signal 42, the background system 6 checks, with the aid of the computer 30 in its first database 32, whether there is a requested test routine for the identified type of the mobile terminal 4. If this is the case, the background system 6 transmits 44 the corresponding test routine to the mobile terminal 4 via the interface 36. The mobile terminal 4 transmits 46 the test routine to the subscriber module 24 via the interface 22.

The test routine is stored in the memory 28 of the subscriber module 24. The processor 26 of the subscriber module 24 activates 48 the test routine.

The test routine transmits 50 to the mobile terminal 24 a query as to whether a program associated with the test routine is stored in the memory 18 of the mobile terminal 24. If the feedback 52 is negative, the subscriber module causes a request 54 for the program. Otherwise, the subscriber module commences the test routine, as will be described hereinafter.

After receiving the request 54, the mobile terminal 4 transmits a request 56 for the program to the background system. The mobile terminal 4 transmits, together with the request 56, a characterising identification.

After receiving the request 56, the background system determines the requested program in a manner appropriate for the identified mobile terminal 4. The program determined is loaded from the first database 32 and transmitted 58 to the mobile terminal 4. The mobile terminal 4 advises 60 the subscriber module 24 of the receipt of the program.

Subsequently, the processor 26 commences the test routine 62. Via the interface 22, functions of the mobile terminal 4 are triggered and functional states of the mobile terminal 4 are transmitted to the subscriber module. The functional states can be stored in the memory 24 or the memory 18. Via the interface 22, AT commands can, for example, be transmitted to the mobile terminal 4. The AT commands can cause the mobile terminal to react as if keys of the keypad were actually pressed. As a result, it is possible to test a menu structure and a sequence of the program without manual keystrokes actually being necessary. Once the test routine 62 has expired, the subscriber module 24 causes 64 the mobile terminal 4 to transmit 66 the stored functional states to the background system 6. In this case, in addition to the stored states, an identification of the mobile terminal 4, the test routine, the program and/or the subscriber module 24 is also transmitted.

The background system stores in the results database 34 the transmitted functional states together with the identification of the mobile terminal 4, the test routine, the program and/or the subscriber module 24. The background system can carry out an evaluation of the test routine by way of a comparison of the stored functional states with desired states and thus ascertain errors in the program.

After completion of the evaluation, the background system can transmit 68 a trigger signal to the mobile terminal 4. When it receives the trigger signal, the mobile terminal can report 70 this to the subscriber module 24. The subscriber module can react thereto with a new request 40 or a request 54 and initiate a new test of an existing program or a new test of a new program.

The described method allows various programs and value-added services to be tested and evaluated on the network side automatically, without interventions in the operating system of the mobile terminal 4.

The invention claimed is:

1. A method for controlling a mobile terminal comprising: receiving a set of control commands in the mobile terminal, the mobile terminal having a processor, a subscriber module and a communications unit; storing the received set of control commands in a memory of the subscriber module for the mobile terminal; and activating functions of the mobile terminal by the subscriber module as a function of commands of the set of control commands via an interface between the subscriber module and the mobile terminal, wherein the set of control commands includes a batch of commands to be carried out on the mobile terminal, wherein the set of control commands comprises at least commands for activating keystroke commands of the mobile terminal.

2. A method according to claim 1, wherein activating functions of the mobile terminal by the subscriber module emulates keystroke inputs of an actual user.

3. A method according to claim 1, wherein the set of control commands is transmitted by a background system.

4. A method according to claim 3, wherein at least one functional state of the mobile terminal is stored in at least one of the memory of the subscriber module and a memory of the mobile terminal, after activation of the functions of the mobile terminal.

5. A method according to claim 4, wherein the at least one functional state is a state of the processor of the mobile terminal or a state of a display of the mobile terminal.

6. A method according to claim 4, wherein the at least one functional state is transmitted to the background system by the communications unit of the mobile terminal.

7. A method according to claim 6, wherein the background system stores the at least one transmitted functional state in a results database.

8. A method according to claim 6, wherein the at least one transmitted functional state is evaluated by the background system.

9. A method according to claim 8, wherein sets of control commands, which are altered by the background system as a function of the evaluation of at least one of a functional state of the mobile terminal, new sets of control commands and new programs, are transmitted to the mobile terminal.

10. A method according to claim 3, wherein the subscriber module requests a program executable on the mobile terminal from the background system by means of the communications unit of the mobile terminal.

11. A method according to claim 10, wherein the background system receives the request for the program executable on the mobile terminal and transmits the program as a response to the request.

12. A method according to claim 3, wherein the mobile terminal communicates with the background system via an air interface or cable interface by means of the communications unit.

13. A method according to claim 3, wherein the mobile terminal communicates with the background system in a packet-switched or circuit-switched manner by means of the communications unit.

14. A method according to claim 1, wherein the subscriber module requests the set of control commands from a background system via the communications unit of the mobile terminal.

15. A method according to claim 14, wherein together with the request for the set of control commands, at least one identification characterizing at least one of the mobile terminal and the subscriber module is transmitted to the background system.

16. A method according to claim 15, wherein the background system evaluates the at least one identification characterizing the at least one of the mobile terminal and the subscriber module and selects, as a function of a result of the evaluation, the set of control commands from a plurality of control command sets for transmission to the mobile terminal.

17. A method according to claim 14, wherein together with the request for the set of control commands, at least one identification characterizing a program executable on the mobile terminal is transmitted to the background system.

18. A method according to claim 17, wherein the background system evaluates the identification characterizing the program executable on the mobile terminal and selects, as a function of a result of the evaluation, the set of control commands from a plurality of control command sets for transmission to the mobile terminal.

19. A method according to claim 14, wherein the background system receives the request for the set of control commands and transmits the set of control commands to the mobile terminal as a response to the request.

20. A method according to claim 1, wherein a request for the set of control commands or for a program executable on the mobile terminal is started by a trigger signal triggered by the mobile terminal.

21. A method according to claim 1, wherein receiving the set of control commands stored in the subscriber module of the mobile terminal is started by a trigger signal triggered in the mobile terminal.

22. A method according to claim 1, characterized in that wherein the interface between the subscriber module and mobile terminal transmits is a standardized interface.

23. A method according to claim 22, wherein the standardized interface is a Subscriber Identity Module Application Toolkit or a Universal Subscriber Identity Module Application Toolkit interface.

24. A method according to claim 1, wherein the subscriber module is a Subscriber Identity Module.

25. A method of controlling a mobile terminal comprising: receiving a request signal for a set of control commands which can be carried out by a subscriber module of the mobile terminal; and selecting in a background system the set of control commands requested for transmission to the mobile terminal and transmitting the selected set of control commands from the background system to the mobile terminal, wherein the set of control commands comprises a batch of commands to be carried out on the mobile terminal and wherein the set of control commands comprises at least one command for activating, by the subscriber module, keystroke commands of the mobile terminal.

26. A method according to claim 23, wherein, together with the request signal, an identification characterizing at least one of the mobile terminal and the subscriber module is received and the set of control commands is selected from a plurality of control command sets as a function of the identification.

27. A mobile terminal comprising:
a subscriber module;
a processor; and
a communications unit configured for receiving a set of control commands,
wherein the subscriber module is configured for storing the received set of control commands,
wherein the subscriber module is also configured for activating functions of the mobile terminal as a function of commands of the set of control commands via an interface between the subscriber module and the mobile terminal, and
wherein the set of control commands comprises a batch of commands to be carried out on the mobile terminal, wherein the set of control commands comprises at least one command for activating keystroke commands of the mobile terminal.

28. A system having a mobile terminal according to claim 27 and a background system having a memory for storing at least one set of control commands and a memory for storing at least one functional state of the mobile terminal.

29. A non-transitory computer usable medium having computer readable instructions thereon, the computer readable program instructions comprising: program instructions for receiving a set of control commands in a mobile terminal comprising a processor, a subscriber module and a communications unit; program instructions for storing the received set of control commands in a memory of the subscriber module; and program instructions for activating functions of the mobile terminal by the subscriber module as a function of commands of the set of control commands via an interface between the subscriber module and the mobile terminal, the set of control commands including a batch of commands to be carried out on the mobile terminal and at least one command for activating keystroke commands of the mobile terminal.

* * * * *

UNITED STATES PATENT AND TRADEMARK OFFICE
CERTIFICATE OF CORRECTION

PATENT NO. : 8,010,096 B2  
APPLICATION NO. : 12/594107  
DATED : August 30, 2011  
INVENTOR(S) : Thomas Kähler et al.

Page 1 of 1

It is certified that error appears in the above-identified patent and that said Letters Patent is hereby corrected as shown below:

In Col. 11, line 47  
delete "characterized in that"

In Col. 11, line 49  
delete "transmits"

Signed and Sealed this  
Seventh Day of February, 2012

David J. Kappos  
*Director of the United States Patent and Trademark Office*